United States Patent [19]

Kühling et al.

[11] 4,072,622

[45] Feb. 7, 1978

[54] STABLE AQUEOUS SUSPENSION OF WATER-INSOLUBLE, CALCIUM-BINDING ALUMINOSILICATES AND ORGANIC SUSPENDING AGENTS

[75] Inventors: Dieter Kühling, Monheim; Josef Huppertz, Dusseldorf-Holthausen; Peter Krings, Krefeld; Herbert Reuter, Hilden, all of Germany

[73] Assignee: Henkel Kommanditgesellschaft auf Aktien (Henkel KGaA), Dusseldorf-Holthausen, Germany

[21] Appl. No.: 620,387

[22] Filed: Oct. 7, 1975

[30] Foreign Application Priority Data

Oct. 10, 1974 Austria .......... 8151/74

June 19, 1975 Germany .......... 2527388

[51] Int. Cl.[2] .......... B01F 3/12; B01F 17/00; B01J 29/06; C02B 1/44

[52] U.S. Cl. .......... 252/179; 252/89 R; 252/131; 252/140; 252/313 S; 252/173; 252/DIG. 14; 423/265; 423/328

[58] Field of Search .......... 252/89, 131, 140, 179, 252/455 Z, 430, 313, DIG. 14, 173; 423/265, 328, 329

[56] References Cited

U.S. PATENT DOCUMENTS

| | | | |
|---|---|---|---|
| 3,206,408 | 9/1965 | Vitalis | 252/557 |
| 3,254,034 | 5/1966 | Dywer | 252/430 |
| 3,281,367 | 10/1966 | Jones | 252/112 |
| 3,677,954 | 7/1972 | Nakajima | 252/121 |
| 3,925,262 | 12/1975 | Laughlin | 252/526 |
| 3,962,132 | 6/1976 | Haschke | 252/430 |

FOREIGN PATENT DOCUMENTS

| | | | |
|---|---|---|---|
| 2,439,572 | 3/1975 | Germany | 252/179 |

*Primary Examiner*—Dennis L. Albrecht

*Attorney, Agent, or Firm*—Hammond & Littell

[57] ABSTRACT

Aqueous suspensions of water-insoluble, calcium-binding aluminosilicates with an improved stability against settling comprising at least 20% by weight of at least one finely-divided, water-insoluble silicate compound having a calcium-binding power of at least 50 mg CaO/gm of anhydrous active substance and having the formula, combined water not shown $$(M_{2/n}O)_x \cdot Me_2O_3 \cdot (SiO_2)_y$$

where M is a cation of the valence *n*, exchangeable with calcium, *x* is a number of from 0.7 to 1.5, Me is aluminum or boron, and *y* is a number from 0.8 to 6, and at least 0.5% by weight of at least one organic dispersing agent as follows:

1. an organic, macromolecular polymer with carboxyl and/or hydroxyl groups,
2. an organic phosphonic acid with at least one additional phosphonic or carboxylic acid group,
3. an alkyl acid phosphate having 3 to 20 carbon atoms in the alkyl
4. a nonionic surface-active compound with a turbidity point in aqueous butoxyethoxyethanol according to DIN 53917 of below 90° C
5. a surface-active sulfonate, and the remainder an aqueous liquor. The said suspensions are pumpable and suitable as stock solution in the preparation of washing agent compositions.

10 Claims, No Drawings

STABLE AQUEOUS SUSPENSION OF WATER-INSOLUBLE, CALCIUM-BINDING ALUMINOSILICATES AND ORGANIC SUSPENDING AGENTS

RELATED ART

As known, the detergents used in the household, in commercial establishments and in industry, frequently contain large quantities of condensed phosphates, particularly tripolyphosphates. These are provided to sequester the hardness formers of tap water and are responsible to a great extent for increasing the cleaning power of the capillary-active washing substances. The phosphorus content of these agents has been criticized by the public in connection with questions of the protection of the environment. The view is frequently expressed that the phosphates, which arrive in the rivers and lakes after treatment of the sewage, have great influence on the eutrophication of the waters, and is said to lead to an increase of the growth of algae and of oxygen consumption. It has therefore been tried to eliminate phosphate from the washing and cleaning processes or from the agents used for this purpose, or at least to substantially reduce its proportion.

Copending, commonly-assigned U.S. patent application Ser. No. 458,306, filed Apr. 5, 1974, and its continuation-in-part application Ser. No. 599,012, filed July 24, 1975, discloses a process for the washing, bleaching or cleaning of solid materials, particularly textiles, by treating these materials with a liquor containing compounds able to bind the cations that make water hard. The process is characterized in that finely-dispersed, water-insoluble silicate compounds having calcium-binding capacity of at least 50 mg CaO/gm of anhydrous active substance (AS) and having the formula I, combined water not shown $$(M_{2/n}O)_x . Me_2O_3 . (SiO_2)_y \quad (I)$$

where M is a cation of the valence *n*, exchangeable with calcium, *x* is a number from 0.7 to 1.5, Me is aluminum or boron, and *y* is a number from 0.8 to 6, preferably from 1.3 to 4, are suspended in the aqueous treatment bath. The process of the patent makes possible the complete or partial replacement of phosphates that bind calcium ions by complexing and are still being used in the washing and cleaning process.

The calcium-binding capacity of the above-defined compounds may reach values of 200 mg CaO/gm AS and is preferably in the range of 100 to 200 mg CaO/gm AS. The above-defined compounds capable of binding calcium are referred to as "aluminosilicates" in the following text, for the sake of simplicity. This applies particularly to the sodium aluminosilicates that are to be used preferably. All data given for their preparation and processing apply accordingly to the totality of the above aluminosilicate compounds as defined in said earlier application.

The cation M employed is preferably sodium. However, the same can also be totally or partially replaced by other cations exchangeable with calcium, such as hydrogen, lithium, potassium, ammonium or magnesium, as well as by the cations of water-soluble organic bases, for example, by those of primary, secondary or tertiary alkylamines or alkylolamines with not more than 2 carbon atoms per alkyl radical, or not more than 3 carbon atoms per alkylol radical.

The anhydrous active substance (AS) of the aluminosilicates is that reached after one hour of drying at 800° C, whenever reference to anhydrous aluminosilicate is made in the following text. The adhering water as well as the water of retention is removed partically completely by this drying.

Aluminosilicates that are still moist, for example, from their preparation, are used to advantage as starting compounds in the preparation of washing and cleansing agent compositions containing the above-defined aluminosilicates in addition to the conventional components. The moist compounds are at least mixed with a portion of the remaining components of the material to be prepared, and the mixture is incorporated into the finished washing and cleansing agent composition to give as the final product, a product that is a pourable powder.

The aluminosilicates are supplied or used, in the framework of the procedure for the preparation of washing and cleansing agent compositions outlined above, as aqueous suspensions or as moist filter cake. Certain improvements of the suspension characteristics, such as the stability of the suspension and the transferability of the aluminosilicates dispersed in the aqueous phase, by pumping, would be desirable.

OBJECTS OF THE INVENTION

An object of the present invention is the development of an aqueous suspension of water-insoluble, calcium-binding aluminosilicates with an improved stability against settling consisting essentially of (A) from 20% to 50% by weight on the anhydrous basis of at least one finely-divided, water-insoluble silicate compound having a calcium-binding power of at least 50 mg CaO/gm of anhydrous active substance and having the formula, combined water not shown $$(M_{2/n}O)_x . Me_2O_3 . (SiO_2)_y$$

where M is a cation of the valence *n*, exchangeable with calcium, *x* is a number of from 0.7 to 1.5, Me is aluminum or boron, and *y* is a number from 0.8 to 6 and (B) from 0.5% to 6% by weight of at least one organic dispersing agent selected from the group consisting of the free acids and alkali metal salts of 1. an organic, macromolecular polymer with carboxyl and/or hydroxy groups,
2. an organic phosphonic acid having at least one further acid group selected from the group consisting of phosphonic acid and carboxyl,
3. an alkyl acid phosphate emulsifier having from 3 to 20 carbon atoms in the alkyl
4. a nonionic surface-active compound having a turbidity point in aqueous butoxyethoxyethanol according to DIN 53917 of below 90° C, and
5. an anionic surface-active sulfonate, in water.

Another object of the invention is the development of a process for the preparation of washing and cleansing agent compositions employing the above suspensions.

These and other objects of the present invention will become more apparent as the description thereof proceeds.

DESCRIPTION OF THE INVENTION

We have now found that certain compounds possess to a special degree, the capability to stabilize suspensions of the above calcium-binding aluminosilicates so that these, even with a high solids content, remain stable for a long time, in fact for a practically unlimited time, and also can still be pumped without problems after long periods of standing. Surprisingly, it has been found that there are certain compounds which are capable of keeping suspensions of moist aluminosilicates which have a bound or adhering water content of 70% or less, pumpable practically, independent of their standing period, which was impossible until now.

The present invention therefore relates to aqueous suspensions of water-insoluble, calcium-binding aluminosilicates, suitable for use as stock suspensions and transferrable by pump, with an improved stability, characterized by the fact that, based on the total weight of the aqueous suspension, they contain A. at least 20%, preferably 20% to 53% and especially 20% to 42% by weight on an anhydrous basis of finely-divided, water-insoluble compounds, capable of binding calcium, of the general formula, combined water not shown $$(M_{2/n}O)_x \cdot Me_2O_3 \cdot (SiO_2)_y \quad I$$

in which the symbols have the meaning given above, and

B. at least one dispersing agent from the group of the following compounds:

1. an organic, macromolecular polymer with carboxyl and/or hydroxy groups,
2. a phosphoric acid with at least one further phosphoric acid and/or carboxyl group,
3. a phosphoric acid alkyl ester emulsifying agent with 3 to 20 carbon atoms in the alkyl,
4. a nonionic tenside with a turbidity point in aqueous butyldiglycol solution, determined according to DIN 53917, of below 90° C, and
5. a surface-active sulfonate.

More particularly, the invention relates to an aqueous suspension of water-insoluble, calcium-binding aluminosilicates with an improves stability against settling consisting essentially of (A) from 20% to 50% by weight on the anhydrous basis of at least one finely-divided, water-insoluble silicate compound having a calcium-binding power of at least 50 mg CaO/gm of anhydrous active substance and having the formula, combined water not shown $$(M_{2/n}O)_x \cdot Me_2O_3 \cdot (SiO_2)_y$$

wherein M is a cation of the valence n, exchangeable with calcium, $x$ is a number of from 0.7 to 1.5, Me is aluminum or boron, and $y$ is a number from 0.8 to 6, and (B) from 0.5% to 6% by weight of at least one organic dispersing agent selected from the group consisting of the free acids and alkali metal salts of 1. an organic, macromolecular polymer with carboxyl and/or hydroxy group,
2. an organic phosphonic acid having at least one further acid group selected from the group consisting of phosphonic acid and carboxyl,
3. an alkyl acid phosphate emulsifier having from 3 to 20 carbon atoms in the alkyl.
4. a nonionic surface-active compound having a turbidity point in aqueous butoxyethoxyethanol according to DIN 53917 of below 90° C, and
5. an anionic surface-active sulfonate, in water.

The acidic organic dispersing agents may be used as such, or as water-soluble salts, and are generally ionized in the suspension, in relation to their pK and the pH of the suspension. The pH of the suspensions is generally between about 7 and 12, preferably between 8.5 and 11.5, and usually below 11.

The above-mentioned compounds are the main components of the suspensions according to the invention. However, additional components may be contained, such as foam-reducing additives or so-called dissolving intermediaries (or solution aids), i.e. compounds that improve the solubility of the added dispersing agents in the aqueous phase. The usual antifoaming agents such as foam-reducing soap, silicones, triazine derivatives, which are all known to those skilled in the art, can be used as foam-reducing substances. Such an addition is not usually necessary; however, it can be desirable with foaming dispersing agents, particularly with larger amounts of alkylbenzene sulfonic acid. The antifoaming agents are employed in amounts of from 0 to 0.5% by weight of the suspension.

Neither is the addition of dissolving intermediaries generally necessary; but it may be indicated if the suspension according to the invention contains a hydrophilic colloid as dispersing agent, that is difficult to dissolve in water, such as polyvinyl alcohol. A dissolving intermediaries is advantageous for example, when the concentration of a dispersing agent of group 1, which is difficult to dissolve in water, exceeds about 1%. Dimethyl sulfoxide is very suitable as a dissolving intermediary. The amount of dissolving intermediary to the total suspension may be on the same order of magnitude as the amount of the stabilizer, for example. The dissolving intermediary may be employed in amounts of from 0 to 6% by weight of the suspension. Other compounds suitable as dissolving intermediaries are generally known to the person skilled in the art. For example, these are hydrotropic substances such as benzene sulfonic acid, toluene sulfonic acid and xylene sulfonic acid or their water-soluble salts, or also octylsulfate.

The condition of the aluminosilicate reached after one hour of drying at 800° C is the basis on which all data of "concentration of the aluminosilicates", "solids content" or content of "active substance" (AS) are based. The adhering water and water of retention is removed practically completely by this drying procedure.

All data in percentages are referring to percent by weight.

The above-mentioned components A and B are discussed in more detail below.

The aluminosilicates of component A to be used according to the invention may be x-ray amorphous or crystalline products, with the use of mixtures of amorphous and crystalline products as well as partially crystallized products being permissible. The aluminosilicates may be naturally occurring or synthetically produced products, however, the synthetically prepared products are preferred. Their preparation can be carried out for example, by reacting water-soluble silicates with water-soluble aluminates in the presence of water. Preferably sodium silicates and sodium aluminates are employed. For this purpose, aqueous solutions of the starting materials can be mixed or one component in solid form can be reacted with the other component present in an aqueous solution. The desired aluminosilicates may also be obtained by mixing the two components in solid form, in the presence of water. Aluminosilicates are also produced by reacting $Al(OH)_3$, $Al_2O_3$ or $SiO_2$ with alkali metal silicate or alkali metal aluminate solutions respectively. The preparation may be carried out according to other well-known processes, also. The invention refers, in particular, to aluminosilicates possessing, in contrast to the layered silicate structure of montmorillonite, a three-dimensional spatial lattice structure.

The preferred calcium-binding capacity, which is in the range of 100 to 200 mg CaO/gm AS and mainly about 100 to 180 mg CaO/gm AS, is found principally in compounds of the following composition:

$0.7 - 1.1\ Na_2O \cdot Al_2O_3 \cdot 1.3 - 3.3\ SiO_2$.

This formula includes two different types of crystal structures (or their non-crystalline precursors) that differ also in their formulas:

a. $0.7 - 1.1\ Na_2O \cdot Al_2O_3 \cdot 1.3 - 2.4\ SiO_2$
b. $0.7 - 1.1\ Na_2O \cdot Al_2O_3 \cdot >2.4 - 3.3\ SiO_2$.

The different crystal structures become apparent in the x-ray diffraction diagram.

The amorphous or crystalline aluminosilicate, present in an aqueous suspension can be separated from the remaining aqueous solution by filtration and drying at temperatures of 50° to 400° C. The product contains a larger or smaller amount of combined water, depending on the drying conditions.

The higher drying temperatures are not generally recommended. It is preferable that a temperature of 200° C is not exceeded in drying, when the aluminosilicate is to be used in washing and cleansing agent compositions. However, the aluminosilicates do not have to be dried at all after their preparation, if they are used for the preparation a suspension according to the invention. On the contrary, and this is especially advantageous, an aluminosilicate that is still moist from its preparation may be used. Also suitable for the preparation of suspensions according to the invention are aluminosilicates that are dried at intermediate temperatures of 80° to 200° C, until the adhering liquid water is removed.

The particle size of the aluminosilicate particles may vary between 0.1 μ and 0.1 mm. This is based on the primary particle size, i.e. to the size of the particles obtained by precipitation and, if desired, subsequent crystallization. Especially advantageous is the use of aluminosilicates consisting to at least 80% by weight of particles measuring 10 to 0.01 μ, particularly 8 to 0.1 μ. It is preferable that these aluminosilicates do not contain any primary or secondary particles with a diameter above 30 μ. Secondary particles are particles that are produced by the agglomeration of primary particles into larger forms. Most important is the range between ca. 1 and 10 μ.

The use of aluminosilicates still moist from their preparation, for the production of suspensions according to the invention, has been especially advantageous with respect to the agglomeration of primary particles into larger forms, since it was found that a formation of secondary particles is practically completely prevented by the use of these moist products.

A more detailed description of the compounds used as component B according to the invention follows.

Preferably water-soluble, but also water-insoluble polymerization products can be used as polymeric polycarboxylic acids of group 1. The suitable polymeric polycarboxylic acids may be polymerizates of the polymerizable monomers that contain carboxyl groups, as well as polymerizates of polymerizable monomers which are subsequently converted into a polycarboxylic acid. In addition to the carboxyl groups, the polymeric polycarboxylic acids may have other functional groups such as hydroxyl groups, which may be etherified or esterified with low-molecular-weight, particularly aliphatic, groups. Examples for such polymeric polycarboxylic acids are poly(α-hydroxy-acrylic acid), as well as mixed polymerization products of acrylic acid or particularly maleic acid with vinyl methyl ether or vinyl acetate, where the vinyl acetate unit in the polymer may be completely or partially hydrolyzed, so that products result that can be considered the products of copolymerization of unsaturated carboxylic acids with the hypothetical vinyl alcohol.

It has been observed that the carboxyl groups in the polymeric polycarbonic acids can be not only partially replaced by hydroxyl groups, as shown, e.g. by suitable copolymerization with suitable monomers, but that products in which all carboxyl groups are replaced by hydroxyl groups are also suitable according to the invention. These are the macromolecular polyhydroxy compounds. Polyvinyl alcohol may be considered the prototype of the suitable macromolecular polyhydroxy compounds. Polyvinyl alcohol may be obtained from polyvinyl acetate by hydrolysis. The hydrolysis does not have to be complete to make the polyhydroxy compound suitable according to the invention. On the contrary, products containing some esterified hydroxyl groups, for example, oxyacetyl groups, in addition to hydroxy groups are suitable.

The molecular weight of the polycarboxylic acids or polyhydroxyl compounds used may vary within broad limits. Particularly suitable are products of polymerization in the molecular weight range above about 1,500. Preferably above about 20,000. However, compounds of much higher molecular weight are eminently suitable, where the preferred polycarboxylic acids still are water-soluble. If the water-solubility of the mentioned compounds is low, a dissolving intermediary may be added. This applies especially to polyhydroxy compounds that do not contain any carboxyl groups. The presence of carboxyl groups facilitates the solubility in water, so that the solubility of the polymeric polycarboxylic acids depends on their content of carboxyl groups and is generally excellent. Preferably the polycarboxyl compounds should contain one carboxyl groups for every 75 to 200 of molecular weight of the molecule. Comparable proportions of hydroxy groups to the molecular weight are also desirable.

As far as the macromolecular compounds used according to the invention contain groups ionizable in an aqueous solution, they can be used in the form of their water-soluble salts, and this is usually preferred. For economical reasons these are generally the alkali metal salts and particularly the sodium salts.

Suitable compounds are found among the polymerizates of the homo-polymerization of acrylic acid, hydroxyacrylic acid, maleic acid, itaconic acid, mesaconic acid, aconitic acid, methylenemalonic acid, citraconic acid, etc., the polymerizates of the copolymerization of the above-mentioned unsaturated carboxylic acids with each other or with ethylenically-unsaturated compounds such as ethylene, propylene, isobutylene, vinyl alcohol, vinyl methyl ether, furan, acrolein, vinyl acetate, acrylamide, acrylonitrile, methacrylic acid, crotonic acid, etc., such as the 1:1 copolymerizate of maleic acid anhydride with ethylene or propylene or furan.

Examples of suitable compounds of group 1, are the abovementioned polyacrylic acid and poly-(α-hydroxyacrylic acid). The last-mentioned may be used as free acid or water-soluble salt, but also in the form of its internal lactone as this is hydrolyzed in the suspension. The previously described products are substantially straight-chained, that is unbranched polymerizates in their polymer skeleton. Aside from the preferred above described synthetic polymers, natural products may optionally also be utilized, such as alginates, carboxymethylcellulose, corn starch, or potato starch, or their derivatives. However, the water-insoluble polymeric three-dimensionally crosslinked polyacrylic acids can also be utilized.

The molecular weights may vary within broad limits; in the case of poly-(α-hydroxyacrylic acid), the molecular weight of the commercial products is generally above 20,000, among the products of copolymerization of vinyl methyl ether with maleic acid (monomer ratio 1:1), the commercial products are generally at about 100,000 to 2,500,000.

The group 2 organic dispersing agents are organic phosphonic acids containing at least a second phosphonic acid group and/or at least one carboxyl group. Alkane polyphosphonic acids, aminoalkane polyphosphonic acids and hydroxyalkane polyphosphonic acids or phosphonoalkane carboxylic acids and amino and hydroxy substituted phosphonoalkane carboxylic acids, among others, are suitable. The alkane is preferably a lower alkane. Examples are propane-1,2,3-triphosphonic acid, butane-1,2,3,4-tetraphosphonic acid, polyvinylphosponic acid, 1-aminoethane-1,1-diphosphonic acid, 1-amino-1-phenylmethane1,1-diphosphonic acid, aminotri(methylene phosphonic acid) methylamino di(methylene phosphonic acid) or ethylaminodi(methylene phosphonic acid), ethylene diaminetetra(methylene phosphonic acid), 1-hydroxyethane-1,1-diphosphonic acid, 2-phosphonobutane-1,2,4-tricarboxylic acid, 2-phosphonobutane-2,3,4-tricarboxylic acid and mixed polymerizates of the polymerizations of vinyl phosphonic acid and acrylic acid. The group 3 emulsifying agents are of the type of the partial esters of phosphoric acid. These are generally esters with 1 to 2 mols, particularly about 1.5 mols, of a preferably saturated alcohol with 3 to 20 carbon atoms in the alkyl chain per mol of phosphoric acid. Especially suitable products are the esters of alkanols with 4 to about 10 carbon atoms, particularly acid phosphoric acid esters with about 1.5 mols of butyl alcohol or isooctyl alcohol.

The group 4 nonionic surface-active compounds or tensides used according to the invention are practically water-insoluble products. Their turbidity point, determined according to DIN (Deutsche Industrienormalien) 53917 in aqueous butoxyethoxyethanol solution, is mainly below 90° C, preferably 80° C and lower. Accordingly, the turbidity points in water, determined in 1% solutions, are below about 55° C for the suitable compounds, preferably below 35° C. The turbidity point of a 1% solution in water of especially suitable products is below room temperature. The most suitable products are characterized by the fact that they can be dispersed in water in an amount of one part of tenside to 19 parts by weight of water, with light or more vigorous shaking if necessary, and with heating above the melting point of the tenside, if necessary, so that they form a milky or gel-like, solidified dispersion on cooling to room temperature. The turbidity points according to DIN 53917 are usually at least 40° C, preferably at least 55° C.

The information concerning the dispersibility in water or the turbidity points refers to the individual, tenside-like dispersing agents in their technically pure form as a statistical mixture of ethoxylation products, such as is obtained by the ethoxylation of fractions of fatty alcohols, fatty acids, fatty acid amides or fatty amines.

The nonionic tenside dispersing agents suitable according to the invention are found expecially among the nonionic surfaceactive compounds containing a long-chain alkyl or alkenyl radical with mainly 10 to 20, preferably 12 to 18 carbon atoms, as the hydrophobic part of the molecule. The alkyl or alkenyl radical is primarily straight chained. However, suitable products are found also among the compounds with branched-chain hydrophobic radicals or even radicals derived from vicinal alkanediols. Unsaturated hydrophobic moieties are mainly mono-unsaturated, as the oleic acid or oleyl moiety found especially frequently.

The hydrophilic group is formed mainly by polyalcohol units such as ethylene glycol, propylene glycol, polyoxyethylene glycol or glycerine units that are connected with the hydrophobic part through ester, amide, ether or amino groups. The ethylene oxide adducts are to be emphasized.

Among the ethylene oxide adducts with the same turbidity point, those with the longer hydrophobic moieties, preferably of from $C_{14}$ to $C_{18}$ are generally preferred.

An important group of suitable nonionic surface-active compounds is found among the carboxylic acid esters and carboxylic acid amides. These are higher fatty acid esters with alcohols having water-solublizing group and higher fatty acid amides having water-solublizing groups. Particularly suitable as dispersing agents in the sense of the invention are the monoethanolamides and diethanolamides of carboxylic acids with 10 to 20, preferably 12 to 18 and especially 12 to 14 carbon atoms. The compounds are preferably derived from saturated and straight-chain carboxylic acids (alkanoic acids). However, the products may also be derived from unsaturated, particularly mono-unsaturated carboxylic acids (alkenoic acids). Particularly monoethanolamine and diethanolamine are suitable as the amine component from which the amide suitable according to the invention is derived. Another particularly suitable product is also the amide derived from a carboxylic acid as defined above, and N-(hydroxyethyl)-ethylene diamine. The suitable amides can be considered to be the reaction products of carboxylic acid amides with ethylene oxide. The number of ethylene oxide units is usually 1 to 6, and especially preferred is 1 to 4.

The ester-like dispersing agents are derived from the same carboxylic acids as the amide-like dispersing agents. As in the case of the amides, the esters are derived from fatty acids or mixtures of fatty acids, particularly of the ranges of chain length given above, that may be of natural or synthetic origin. Suitable as ester-like suspension stabilizers are the products that may be considered addition products of the carboxylic acids with ethylene oxide. These are preferably the addition products of carboxylic acids with 1,2 or 3 mols of ethylene oxide per mol of carboxylic acid. However, products with 4 to 10 ethylene oxide units are also suitable. Also suitable as alcohol components in the surface-active ester are polyalcohols with more than 2 hydroxyl groups, e.g. glycerin.

Examples of especially suitable dispersing agents or suspension stabilizers of the amide or ester type are the following compounds: monoethanolamide of lauric acid, monoethanolamide of coconut fatty acid, myristic acid monoethanolamide, palmitic acid monoethanolamide, stearic acid monoethanolamide, oleic acid monoethanolamide, tallow fatty acid monoethanolamide, and the diethanolamides derived from the same fatty acids and the amides derived from N-(hydroxyethyl)-ethylene diamine. Representatives of the ester-like stabilizers are the addition products of 1 and 2 mols of ethylene oxide to coconut fatty acid and of propylene glycol or glycerin to stearic acid or palmitic acid.

Especially suitable diethanolamides are lauric/myristic acid diethanolamide, the diethanolamide of a mixture of fatty acids of lauric acid and myristic acid, and oleic acid diethanolamide.

Another particularly good group of stabilizers is found among the ethoxylation products of preferably saturated alcohols containing 10 to 20 carbon atoms with 1 to 8 mols of ethylene oxide per mol of the alcohol. Preferred products among these ethoxylation products are those with 2 to 7, particularly with 2 to 6, mols of ethylene oxide per mol of the alcohol. The use of derivatives of straight-chain alcohols is particularly advantageous within the framework of the invention. However, derivatives of branched-chain alcohols, especially of alcohols prepared by oxosynthesis, can also be used. Especially preferred are the derivatives of preferably saturated and preferably straight-chain alcohols containing 16 to 18 carbon atoms. The alcohols employed are preferably alkanols, alkenols and alkanediols having from 12 to 18 carbon atoms. Ethoxylation products of alcohols containing 12, and especially 14, carbon atoms can also be used, and products with 1 to 5 mols of ethylene oxide, especially with 2 to 4 mols of ethylene oxide, per mol of the alcohol are especially suitable.

The ethoxylation products used according to the invention are generally not chemically uniform compounds, but are rather common mixtures containing adducts of varying degrees of ethoxylation together in statistical distribution, including the ethoxylation degree "0". The non-ethoxylated starting material is usually present in small amounts in the final products. The ethoxylation products used according to the invention are practically waterinsoluble compounds. Their turbidity point, determined according to DIN 53917 in aqueous butoxyethoxyethanol solution, is usually in the range of about 55° to 85° C. Typical, preferably used products are saturated fatty alcohol ethoxylation products, derived from tallow fatty acid, with a turbidity point respectively of 58° C, 71° C, 77° C and 83° C for a degree of ethoxylation of 2,4, 5 and 7 mols of ethylene oxide, respectively, per mol of the fatty alcohol.

The alcohol component such as the tallow fatty alcohols of the $C_{16}$ to $C_{18}$ range, is usually a technical mixture where alcohols with more and/or less carbon atoms may be present, mainly in small amounts of up to 15%. What is said below about the additional substances that may be present, if desired, also applies for amounts exceeding the above.

The respective ethoxylation products of fatty amines can be used instead of the mentioned ethoxylation products of alcohols, especially ethoxylation products of preferably saturated primary amines or fatty amines with 16 to 18 carbon atoms and 1 to 8 mols of ethylene oxide per mol of amine. Also suitable are the nonethoxylated amines which are tensides in the sense of the definition of the invention, as well as products with 2 to 5 mols of ethylene oxide per mol of amine.

Water-insoluble nonylphenol ethylene oxide adducts with 5 to 8 mols of ethylene oxide per mol of phenol are suitable alkylphenol products with a turbidity point in water of below room temperature, or below 85° C according to DIN 53917. Adducts with 6 to 7 mols ethylene oxide are preferred.

Suitable organic surface-active compounds or tensides of the sulfonate type of group 5 are alkylbenzene sulfonates ($C_9$ to $C_{15}$ alkyl), olefin sulfonates, that is mixtures of alkene sulfonates and hydroxyalkane sulfonates as well as alkane disulfonates, as obtained from $C_{12}$ to $C_{18}$ monoolefins, with terminal or non-terminal double bonds, by sulfonation with gaseous sulfur trioxide and subsequent alkaline or acid hydrolysis of the sulfonation products. Also suitable are especially the esters of α-sul-fo-fatty acids, e.g. α-sulfo-acids of methyl or ethyl esters of hydrogenated coconut, palm oil or tallow fatty acids. The most preferable stabilizing compounds with the scope of the invention are, however, the nonionic tensides of group 4.

Mixtures can be used in addition to the single dispersing agents, where a synergistic interaction is observed in several cases. For example, the addition of tallow fatty amine, carboxymethyl cellulose, crosslinked polyacrylate or alginic acid to suspensions stabilized by tenside, for example, the combination of the stabilizers of group 1 with those of group 4 and particularly group 5, has been found to be advantageous. An additional class of compounds which further improve suspensions stabilized according to the invention are the long-chain fatty acids. These are natural or synthetic, preferably saturated, fatty acids, usually with 10 to 20 carbon atoms in the molecule, such as tallow fatty acid. When employed, the fatty acids are percent in an amount of from 0 to 6% by weight in the suspension.

Aqueous suspensions especially preferred in the invention consist mainly of at least 20% of component A. The upper limit of the content of the aluminosilicate component A is determined by the limit of the flow characteristics, which lies generally at under 50%, for example about 42% by weight. Concentrations between 25% and 40% by weight, especially between about 28% and 38% by weight, are preferred. The range of 30% to 38% by weight is the most important for practical application.

The amount of component B to be used depends mainly on the desired degree of stabilization of the suspensions. In general, the concentration of component B of the suspensions according to the invention lies between about 0.5% to 6%, more often from 0.8% to 6% by weight, calculated on the total weight of the aqueous suspension. It is preferably in the range of about 1% to 4% by weight and in most cases about 1.3% to 3% by weight, as a matter of practicality. The desired viscosity can be taken into consideration in the selection of the concentration of component B, if necessary, since the viscosity of the suspensions is influenced by the content of component B.

Smaller amounts of component B are used for the stabilization of the finer aluminosilicates than of coarser products. For example, aluminosilicate suspensions containing 90% or more of particles measuring between 1 and 8 μ can be stabilized equally well by a content of from 0.5% to 1% by weight of dispersing agent, as products with intermediate size particles of 10 to 12 μ which are stabilized by 1% to 2% of dispersing agent.

These data are only guidelines. The suitable amount of component B must be determined for the definite requirements of the individual case.

The viscosity of the suspension at 25° C should in general be between 500 to 30,000, preferably above 1000 but under 15,000 cps. Particularly suitable are suspensions with a viscosity in the range of between 1000 and 9000 cps.

Especially preferred aqueous suspensions in the invention consist mainly of at least 20% of component A, at least about 0.5% preferably at least about 0.8% of component B and water.

Inorganic salts or hydroxides from the precipitation or other processes for the preparation of the aluminosilicates are present in addition to the mentioned components. That is, small amounts of excess sodium hydroxide, or sodium carbonate or bicarbonate formed from it by absorption of carbon dioxide may be present, or the sulfate ion, if aluminum sulfate was used as the aluminum-containing starting material for the preparation of aluminosilicate.

Basically, the aqueous suspensions also may contain additional substances in relatively small amounts besides the mentioned components A and B and, if necessary, substances remaining from the starting materials for the preparation of these components. Where the suspensions for washing agents and detergents are to be processed further, the additionally present substances are preferably substances suitable as components of washing and cleansing agent compositions.

An indication of the stability of the suspensions is provided by a simple test, in which an aluminosilicate suspension is prepared of the desired concentration, such as 31%, and containing a dispersing agent according to the invention as well as optionally other substances, and/or detergent components such as pentasodium tripolyphosphate, in varying amounts. The influence of the added substances can be observed visually by the precipitation characteristics of the suspension. A preferred suspension generally should not have settled beyond the point where the clear supernatant liquid, the solution free from silicate particles, amounts to more than 20%, preferably more than 10%, especially more than 6%, of the total height, after standing for 24 hours. In general, the amount of additives should be adjusted so that the suspension can be readily transferred again by pumping after standing for 12 hours, preferably 24 hours and especially also after 48 hours of standing in the storage tank and pipes or tubes. The settling characteristics of the suspensions containing further components, if desired, is tested at room temperature, at an overall height of 10 cm for the suspension. If the height of the clear supernatant liquid of especially preferred suspensions stays within the given range, even after 4 and especially after 8 days, they can be pumped without any problem after 4 and after 8 days. These data concerning the stability of the suspension again are guidelines. The desirable stability for the suspension must be determined for each individual case. When using the suspensions according to the invention as stock suspensions for extended storage in a tank; from which it can be removed by pumping, it may be advantageous to keep the portion of other components of washing and cleansing agent compositions, low or to eliminate them completely.

The suspensions can be prepared by the simple mixing of their components, in which process the aluminosilicates may be used, as is or moist, optionally from their preparation, or in aqueous suspension. Especially advantageous is the addition of aluminosilicates that are still moist, as filter cakes, to a dispersion of component B in water. This dispersion of component B is preferably warmed, to 50° to 70° C.

Dried aluminosilicates, for example, substances from which the adhering water has been removed, but that contain bound water, can also be used in the preparation of stable suspensions.

In an especially suitable process for the preparation of the suspensions according to the invention, aluminosilicate is precipitated by mixing sodium aluminate and sodium silicate solutions. These solutions are more alkaline, thus containing more theoretical sodium hydroxide than is necessary for the formation of the final aluminosilicate, so that an excess of sodium hydroxide is present in the aluminosilicate suspension, the immediate product of precipitation. This suspension is concentrated by filtering off part of the supernatant mother liquor, and subsequently freed from a sufficient amount of the excess sodium hydroxide present by rinsing with water, so that the sodium hydroxide content of the suspension is below about 5%, preferably below 3% or even below 2% by weight. The remaining sodium hydroxide is neutralized by the addition of an acid, particularly aqueous sulfuric acid, to such a degree that the obtained suspension ahs a pH between about 7 and 12, particularly between about 8.5 and 11.5. The amount of dispersing agent necessary to achieve the desired degree of stabilization is added to the suspension. This addition may be made before, during or after the partial neutralization step.

It is particularly suitable to perform the partial neutralization at least partly with a dispersing agent having an acid character, that is with a macromolecular polycarboxylic acid or alkylbenzene sulfonic acid as defined above, for example. These acidic dispersing agents can thus be used as the acid for the neutralization step and can replace, completely or partially, the non-stabilizing acids, such as the sulfuric acid mentioned as an example.

The suspensions according to the invention are characterized by high stability and other advantages. Their stabilizing effect is particularly valuable for aluminosilicates with a particle size of 5 to 30 $\mu$. They can be pumped, permitting the easy handling of moist aluminosilicates. The suspensions can be moved without any problem by pumping, even after longer interruptions in the pumping process. Due to their high stability, the suspensions can be transported in regular tank trucks and drum trucks without formation of useless or interfering residues. The suspensions are therefore exceptionally suitable as a form in which aluminosilicates can be delivered to detergent manufacturers, for example.

The suspensions can be stored at room temperature or higher temperatures, and transported through pipe lines, pumps or other means. The suspensions are usually handled between room temperature, most preferably and about 60° C.

Particularly suitable are the suspensions according to the invention for the processing of flowing or trickleable products with a dry appearance, and for the preparation of powdery water softeners, through spray-drying. Thus, the suspensions have considerable value for the preparation of powdery aluminosilicates. No troublesome residues are found during the feeding of the aqueous suspension into the drying equipment. It was also observed that the suspensions of the invention can be processed into extremely dust-free products.

Because of their special stability, the suspensions according to the invention can be used as they are, without further compounding and with or without further additives possessing a cleansing bleaching and/or washing effect, for example as water softeners, washing or cleansing agents and particularly as liquid scouring products with increased suspension stability.

An especially important use of the suspension is in the further conversion into pourable or trickleable washing and cleansing agents and containing other compounds in addition to the components of the suspension.

The suspensions according to the invention are especially suitable for the preparation of washing and cleansing agent compositions described in the U.S. patent applications Ser. Nos. 458,306, 458,333 and 458,326, all filed Apr. 5, 1974, and all data for their preparation, their composition components and for the proportions of the components are applicable correspondingly.

Thus the invention also concerns a process for the preparation of pourable powdery products with a content of water-insoluble aluminosilicates, as defined above, in which a pourable product is produced in the usual manner by starting with an aqueous, flowing solution of a premix of individual components of the products. The process is characterized by the fact that the aluminosilicates are used in the form of the suspensions according to the invention. The suspensions according to the invention can be converted into the solid, pourable washing and cleansing agent compositions by well-known processes.

Powdered, trickleable washing and cleansing agent compositions according to the invention are prepared in such a manner that a suspension according to the invention, from a storage tank, is mixed with at least one washing, bleaching or cleaning component of the product to be prepared, and that the mixture is subsequently converted into a powdered product by a customary process. A sequestering agent, a compound capable of binding the alkaline earth metal ions that make the water hard, particularly the magnesium and calcium ions, is added to advantage.

In general, the suspension according to the invention is combined preferably with at least one water-soluble surface-active compound tenside for the preparation of washing and cleansing agent compositions according to the invention, which is not one of the possible substances of component B.

There are several variations of the preparation of washing and cleansing agent compositions. For example, the suspensions according to the invention can be combined with substances capable of adding water of crystallization, preferably by spraying the suspension onto the anhydrous or partially anhydrous compounds capable of adding water of crystallization, placed in a mixer, so that with constant mixing, a finally solid product of dry appearance is obtained. However, the suspensions according to the invention are preferably mixed into a slurry, and spray-dried with at least one additional washing, bleaching or cleansing substance. Additional, surprising advantages of the claimed aluminosilicate suspensions are observed herein. It has been found that highly dust-free products can be obtained through the use of the suspensions according to the invention for spray-drying. The products of spray-drying have a high capacity for binding calcium and are readily wettable.

Washing agent compositions according to the invention, that is washing agent compositions that can be prepared with the use of the suspensions described above, may have various compositions. Generally, they contain at least one water-soluble tenside that does not belong to the dispersing agents used according to the invention and present in the claimed aluminosilicate suspensions. The washing and cleansing agent compositions of the invention can be in general agreement with the overall formulations of the above-mentioned, prior patent applications. They contain an aluminosilicate, defined as above, as a calcium-binding compound, in addition to at least one other inorganic or organic compound that has a washing, bleaching or cleansing effect. Furthermore, such products may contain other conventional additives and adjuncts found mainly in smaller quantities. The above-mentioned, prior patent applications should be consulted for further details. The data also apply to these cases.

The content of aluminosilicates of such products may be from 5% to 95%, preferably from 15% to 60% by weight.

The compositions according to the invention may also contain sequestering or precipitating agents for calcium, preferably with contents of 2% to 15% by weight, depending on the chemical nature of the agents.

The substantially phosphorus-free washing agent compositions should have a content of inorganic phosphates and/or organic phosphorus compounds not exceeding a total content of 6% P, preferably of 3% P.

The additional components with a washing, bleaching or cleansing effect contained in the washing and cleansing agent compositions are surface-active compounds, surface-active or nonsurface-active foam stabilizers or inhibitors, textile softeners, neutral or alkaline builders, chemically active bleaches as well as stabilizers and/or activators, that are different from component B. Other additives and adjuncts are usually present in smaller amounts, such as corrosion, inhibitors, antimicrobial agents, soil suspension agents, enzymes, optical brighteners, dyes and perfumes.

The composition of typical washing agent compositions to be used at temperatures between 50° and 100° C is in the range of the following formulation.

3% to 30%, preferably 5% to 30%, of anionic and/or amphoteric and/or nonionic surface-active compounds, including surface-active compounds used according to the invention;

5% to 70% of aluminosilicates (calculated for AS);

2% to 45% of sequestering agents for calcium, including the sequestering agents of component B;

0 to 50% of wash alkalis not capable of forming complexes (alkaline builders);

0 to 50% of bleaching agent components as well as other adjuncts mainly found in smaller amounts in textile washing agent composition, Following is an enumeration of compounds suitable for use in the products according to the invention.

The surface-active compounds or tensides contain in the molecule at least one hydrophobic organic moiety and one water-solubilizing, anionic, non-ionic or amphoteric group. The hydrophobic moiety is mostly an aliphatic hydrocarbon radical with 8 to 26, preferably 10 to 22 and particularly 12 to 18 carbon atoms or an alkyl aromatic radical, such as alkylphenyl, with 6 to 18, preferably 8 to 16 aliphatic carbon atoms.

Among the anionic surface-active compounds are, for example, soaps of natural or synthetic, preferably saturated, fatty acids, optionally, also, soaps of resinic or naphthenic acids. Suitable synthetic anionic tensides are those of the type of the sulfonates, sulfates and synthetic carboxylates.

Suitable tensides of the sulfate type are the sulfuric acid monoesters of primary alcohols (e.g. from coconut fatty alcohols, tallow fatty alcohols or oleyl alcohol) and those of secondary alcohols. Also suitable are sulfated fatty acid alkanolamides, sulfated fatty acid monoglycerides or sulfated reaction products of 1 to 4 mols of ethylene oxide with primary or secondary fatty alcohols or alkylphenols.

Nonionic tensides that may be present in addition to the ethoxylation products used according to the invention are mainly the addition products of 9 to 4, preferably 9 to 20 mols of ethylene oxide onto 1 mol of a fatty alcohol.

Nonionic tensides of the type of the aminoxides and/or sulfoxides are also suitable.

The amphoteric surface-active compounds or tensides are of the type of the carboxybetaines or sulfobetaines.

Compounds capable of binding calcium as a complex, as well as those that do not possess this property, are suitable as builders. The alkali metal bicarbonates, carbonates, borates or silicates, or wash alkalis, the alkali metal sulfates as well as the alkali metal salts of organic sulfonic acids, carboxylic acids and sulfocarboxylic acids that do not possess any surface activity and contain 1 to 9 carbon atoms are examples of the non-complexing builders. Specific examples are the water-soluble salts of benzene, toluene or xylenesulfonic acid as well as the water-soluble salts of sulfoacetic acid, sulfobenzoic acid or of sulfodicarboxylic acids. The complexing builders are the alkali metal tripolyphosphates, as well as a large number of the known organic complexing agents of the type of the polycarboxylic acids, also including polymeric carboxylic acids, of the aminocarboxylic acids, phosphonic acids, phosphonocarboxylic acids, hydroxycarboxylic acids, carboxyalkyl ethers, etc.

Suitable bleaching agents are compounds that release $H_2O_2$ in aqueous solution, such as alkali metal perborates, or substances releasing active chlorine. Other additives, present mainly in small amounts, are foam stabilizers or inhibitors, textile softeners, stabilizers and/or activators for bleaching agents, corrosion inhibitors, antimicrobial compounds, soil suspension agents, enzymes, optical brighteners, dyes and perfumes.

The products prepared according to the invention can be used for the various cleaning tasks in numerous technical areas and in the household. Examples of such areas of application are the cleaning of tools, vessels of wood, plastics, metal, earthenware, glass, etc. in the industry or in commercial establishments, the cleaning of furniture, walls, floors, objects of earthenware, glass, metal, wood, plastics, the cleaning of polished or shellacked surfaces in the household, etc. An especially important area of application is the washing of textiles of all types in the industry, in commercial cleaning establishment and in the household.

The following specific embodiments all illustrative of the invention without being limitative in any respect.

EXAMPLES

Preparation of aluminosilicates

First, the synthesis of aluminosilicates used in the suspensions according to the invention is described for which no invention is claimed. The description is purely illustrative; other well-known processes for the preparation of aluminosilicates can be used as described in the U.S. patent application Ser. Nos. 458,306, 458,333 and 458,326, all filed Apr. 5, 1974.

($\alpha$) The sodium aluminate solution was reacted with the calculated amount of sodium silicate solution under vigorous agitation in a 15 liter vessel (temperature of the solutions 20° to 80° C). A sodium aluminosilicate that was x-ray amporphous was produced as primary precipitation product in an exothermic reaction. After ten minutes of vigorous agitation the suspension of the precipitation product was either 1. processed further directly, i.e. without crystallization, or 2. heated at 80° C for 3 to 6 hours for crystallization, or aging, after which products were obtained completely crystalline according to x-ray.

($\beta$) The mother liquor was filtered off from the suspensions obtained above. The remaining filter cake was washed with deionized water and then mixed with deionized water to form the suspension $\alpha$1 (from $\alpha$1) or $\beta$2 (from $\beta$2).

($\gamma$) A microcrystalline aluminosilicate was prepared by reacting the aluminate solution, diluted with deionized water, with the silicate solution, with vigorous agitation with a high-speed agitator (10,000 rpm; "Ultraturrax" made by Janke & Kunkel IKA-Werk, Stauffen/Breisgau, Federal Republic of Germany). After ten minutes of vigorous agitation, the suspension of the amorphous precipitation product was transferred to a crystallization vessel, where the formation of large crystals was prevented by agitating the suspension. After the removal of the liquor from the crystal mass by suction and washing with deionized water until the collected wash water had a pH of about 10, the filter residue was dried, then pulverized in a ball mill and separated into two fractions by a centrifugal sifter ("Microplex" air sifter by Alpine, Augsburg, Federal Republic of Germany). The finer fraction did not contain any particles above 10 $\mu$. From the finer fraction, a suspension in deionized water ($\gamma$1) was prepared. A corresponding suspension was also prepared without the drying process and the separation into two fractions. The moist filter cake of variable moisture content was added to water. The suspension obtained is called $\gamma$2. The separation of the silicates from the larger portion of the originally present water was carried out by centrifuging instead of filtration in some cases.

The aluminosilicates obtained had the approximate composition calculated for anhydrous products (AS):

$$1\ Na_2O\ .\ Al_2O_3\ .\ 2\ SiO_2.$$

The calcium binding power of the precipitation products was 150 to 175 mg CaO/gm active substance. The calcium binding power was determined as follows. One liter of an aqueous solution containing 0.594 gm $CaCl_2$ (300 mg CaO/1 = 30° dH) and adjusted to pH 10 with dilute NaOH was reacted with 1 gm of the aluminosilicate (on the anhydrous basis, AS). Then, the suspension was agitated vigorously for 15 minutes at a temperature of 22° C + 2° C. After filtering the aluminosilicate, the residual hardness $x$ of the filtrate was determined. The calcium binding power was calculated from this in mg CaO/gm AS, using the formula $$(30 - x)\ .\ 10.$$

Producting conditions for aluminosilicate I

Precipitation:

2.985 kg of an aluminate solution of the composition: 17.7% $Na_2O$, 15.8% $Al_2O_3$, 66.6% $H_2O$ 0.15 kg of sodium hydroxide 9.420 kg of water 2.445 kg of a 25.8% sodium silicate solution of the composition 1 $Na_2O$ . 6.0 $SiO_2$, prepared freshly from commercial waterglass and easily alkali-soluble silica Crystallization 24 hours at 80° C Drying:

24 hours at 100° C

Composition:

0.9 $Na_2O$ . 1 $Al_2O_3$ . 2.05 $SiO_2$ . 4.3 $H_2O$ (= 21.6% $H_2O$)

Degree of crystallization:

Fully crystalline

Calcium binding power:

150 mg CaO/gm AS.

If the product obtained was dried for 1 hour at 400° C, an aluminum silicate Ia was obtained of the composition:

0.9 $Na_2O$ . 1 $Al_2O_3$ . 2.04 $SiO_2$ . 2.0 $H_2O$ (= 11.4% $H_2O$)

which is likewise suitable for the purposes of the invention.

Product conditions for aluminosilicate II

Precipitation:

2.115 kg of an aluminate solution of the composition: 17.7% $Na_2O$ 15.8% $Al_2O_3$, 66.5% $H_2O$ 0.585 kg of sodium hydroxide 9.615 kg of water 2.685 kg of a 25.8% sodium silicate solution of the composition: 1 $Na_2O$ . 6 $SiO_2$ (prepared as under I)

Crystallization:

24 hours at 80° C

Drying:

24 hours at 100° C and 20 torr.

Composition:

0.8 $Na_2O$ . 1 $Al_2O_3$ . 2.655 $SiO_2$ . 5.2 $H_2O$

Degree of crystallization

Fully crystalline

Calcium binding power:

120 mg CaO/gm AS.

This product too can be dehydrated by drying (for 1 hour at 400° C) to the composition:

0.8 $Na_2O$ . 1 $Al_2O_3$ . 2.65 $SiO_2$ . 0.2 $H_2O$

This dehydration product IIa is likewise suitable for the purposes of the invention.

The aluminosilicates I and II show in the x-ray diffraction diagram the following interference lines.

| d- values, recorded with Cu-$K_\alpha$- radiation in A | |
|---|---|
| I | II |
| — | 14.4 |
| 12.4 | — |
| — | 8.8 |
| 8.6 | — |
| 7.0 | — |
| — | 4.4 (+) |
| 4.1 (+) | — |
| — | 3.8 (+) |
| 3.68 (+) | — |
| 3.38 (+) | — |
| 3.26 (+) | — |
| 2.96 (+) | — |
| — | 2.88 (+) |
| — | 2.79 (+) |
| 2.73 (+) | — |
| — | 2.66 (+) |
| 2.60 (+) | — |

It is quite possible that not all these intereference lines will appear in the X-ray diffraction diagram, particularly if the aluminosilicates are not fully crystallized. For this reason, the d-values which are the most important for the characterization of these types are identified by a "(+)".

Production conditions for aluminosilicate VIII

Precipitation:

2.115 kg of an aluminate solution of the composition 17.7% $Na_2O$, 15.8% $Al_2O_3$, 66.5% $H_2O$ 0.585 kg of sodium hydroxide 9.615 kg of water 2.685 kg of a 25.8% sodium silicate solution of the composition: 1 $Na_2O$. 6 $SiO_2$ (prepared as in I)

Crystallization:

not carried out

Drying:

24 hours at 100° C

Composition:

0.8 $Na_2O$ . 1 $Al_2O_3$ . 2.65 $SiO_2$ . 4 $H_2O$

Degree of Crystallization:

X-ray amorphous

Calcium binding power:

60 mg CaO/gm AS.

Production conditions for aluminosilicate IX

Precipitation:

3.41 kg of an aluminate solution of the composition 21.4% $Na_2O$, 15.4% $Al_2O_3$, 63.2% $H_2O$, 10.46 kg of water, 1.13 kg of a 34.9% sodium silicate solution of the composition: 1 $Na_2O$ . 3.46 $SiO_2$;

Crtstallization:

not carried out;

Drying:

24 hours at 100° C;

Composition:

1 $Na_{2/O}$ . 1 $Al_2O_3$ . 1 $SiO_2$ . 1.4 $H_2O$;

Degree of crystallization:

X-ray amorphous

Calcium binding power:

120 mg CaO/gm AS.

Production conditions for aluminosilicate XXm

Precipitation:

0.76 kg of an aluminate preparation of the composition: 36.0% $Na_2O$, 59.0% $Al_2O_3$, 5.0% $H_2O$, 0.94 kg of sodium hydroxide, 9.49 kg of water, 3.94 kg of a commercial sodium silicate solution of the composition: 8.0% $Na_2O$, 26.9% $SiO_2$, 65.1% $H_2O$;

Crystallization:

12 hours at 90° C;;

Drying:

12 hours at 100° C;

Composition:

0.9 $Na_2O$ . 1 $Al_2O_3$ . 3.1 $SiO_2$ . 5 $H_2O$;

Degree of crystallization:
completely crystalline
Calcium binding power:
110 mg CaO/gm AS.

The abbreviations used in the following text mean:

TA + EO — an addition product of *x* mols ethylene oxide (EO) per mol of a mainly saturated fatty alcohol mixture with varying carbon atoms, prepared by the reduction of a tallow fatty acid. The fatty alcohol mixture has the following approximate distribution:
$C_{12}$: 0 - 2%
$C_{14}$: 4 -0 7%
$C_{16}$: 25 - 35%
$C_{18}$: 60 - 67%
$C_{20}$; 0 - 2%

CA + 6EO — an ethoxylation product of 6 mols of ethylene oxide per mol of a mainly saturated fatty alcohol fraction consisting of equal parts of a $C_{16}$ alcohol and a $C_{18}$ alcohol and having 2 % each of $C_{14}$ and $C_{20}$ alcohol, prepared by reduction of coconut oil fatty acid and subsequent distillation.

OXO + 5EO — the ethoxylation product of 5 mols of ethylene oxide per mol of an alcohol mixture obtained by oxosynthesis and having the following composition:

| | | straight chain | branched |
|---|---|---|---|
| $C_{15}$: | 1.5% | 0.9% | 0.6% |
| $C_{16}$: | 29.7% | 10.5% | 19.2% |
| $C_{17}$: | 41.5% | 12.4% | 29.1% |
| $C_{18}$: | 21.4% | 8.2% | 13.2% |
| $C_{19}$: | 5.2% | 0.6% | 4.6% |
| | | 32.6% | 66.7% |

OA + 10EO — an addition product of 10 mols of ethylene oxide per mol of a technical grade oleyl alchol.

EDTA — the salt of ethylenediaminetetraacetic acid;

CMC — the salt of carboxymethyl cellulose;

ABS — the salt of an alkylbenzene sulfonic acid with about 11 to 13 carbon atoms in the alkyl chain, obtained by condensation of straight-chain olefins with benzene and sulfonation of the alkylbenzene produced in this manner.

Sodium silicate — a sodium silicate ($NA_2O : SiO_2$, theoretically 1 : 3.35

Perborate — a technical grade product of the approximate composition $$NaBO_2 . H_2O_2 . 3\ H_2O .$$

All salt-like compounds were employed in the form of the sodium salts.

AC — a still water-soluble polyacrylic acid or its sodium salt (molecular weight of polyacrylic acid >0 1,500).

Cop 1 — lauric acid monoethanolamide
Cop 2 — myrstic acid monoethanolamide
Cop 3 — lauric/myristic acid monoethanolamide
Cop 4 — coconut oil fatty acid monoethanolamide
Cop 5 — laric/myristic acid diethanolamide
Cop 6 — oleic acid diethanolamide
PVA — polyvinyl alcohol (molecular weight > 1,500).

SUSPENSIONS ACCORDING TO THE INVENTION

EXAMPLE 1

The suspensions according to the invention are illustrated with the microcrystalline aluminosilicates prepared according to $\gamma 2$, since these are preferred for the preparation of washing and cleansing agent compositions. The suspensions according to the invention can also correspondingly be prepared from the suspensions of $\beta 1$, $\beta 2$ and $\gamma 1$ or from corresponding aluminosilicates isolated as solids.

155 to 195 gm of moist aluminosilicates ($\gamma 2$ process) were employed. The amount of moist aluminosilicate used was adjusted to the moisture content so that the same amount on an anhydrous basis (AS) was added. The moist aluminosilicates were added to a mixture of so many parts of water and dispersing agent that the mixtures obtained had a content of as active substance (AS) of aluminosilicate in the range of 30% to 38% by weight. The amount of the added dispersing agent was 1.3% to 3% by weight. The process was carried out at room temperature.

The dispersing agents were the ethoxylation products given in Table I and the ethoxylation products and amides given in Table I*a*. The turbidity points are also given. Several suspensions and the components from which they were prepared are given in Table 2.

TABLE I

| Ethoxylation product used | Turbidity point according to DIN 53917 ° C |
|---|---|
| 1. TA + 2EO | 58 |
| 2. TA + 4EO | 71 |
| 3. TA + 5EO | 77 |
| 4. TA + 7EO | 83 |
| 5. Mixture of TA + 2EO and TA + 7EO (1:1) | 77 |
| 6. Mixture of TA + OEO (nonethoxylated tallow fatty alcohol) and TA + 7EO (1:1) | 76 |
| 7. Mixture of TA + 2EO and TA + 12EO (1:1) | 76 - 77 |
| 8. Mixture of TA + 5EO and TA + 12EO (1:1) | 83 |
| 9. CA + 6EO | 80 |

The ratios are by weights.

TABLE Ia

| Additional dispersin agents | Turbidity point ° C (DIN 53917) |
|---|---|
| myristic acid monethanolamide | 59 |
| lauric acid monethanolamide | 59 |
| lauric/myristic acid monoethanolamide | 61.5 |
| oleic acid diethanolamide | 77.5 |
| lauric/myristic acid diethanolamide | 87 |
| stearic acid monoethanolamide | 64 |
| tallow fatty amine + 5EO | 83.5 |
| tallow fatty amine | 40 |
| unsaturated tallow fatty alcohol + 5EO | 72 |
| coconut oil fatty acid monoethanolamide + 2EO | 79 |
| $C_{12}$ to $C_{14}$ fatty acid + 4EO about | 68 |
| coconut oil fatty amine + 2EO | |
| nonylphenol + 6.5EO | 72 |
| nonylphenol + 7EO | 73 |

TABLE 2

| 1 AS-content (weight %) | 2 Amount gm | 3 As in suspension (gm) | 4 As in suspension (weight %) | 5 Added $H_2O$ | 6 TA + EO (x) | 7 TA + EO (gm) % |
|---|---|---|---|---|---|---|
| 50 | 600 | 300 | 30 | 370 | 5 | 30 |
| 50 | 650 | 331 | 33 | 330 | 5 | 20 |
| 50 | 650 | 331 | 33 | 340 | 5 | 10 |
| 44.3 | 750 | 332 | 33 | 230 | 5 | 20 |

TABLE 2-continued

| 1 AS-content (weight %) | 2 Amount gm | 3 As in suspension (gm) | 4 (weight %) | 5 Added $H_2O$ | 6 TA + EO (x) | 7 (gm) % |
|---|---|---|---|---|---|---|
| 39.8 | 700 | 278 | 30 | 200 | 5 | 20 |
| 39.8 | 780 | 310 | 31 | 190 | 2+12 | 30 |
| 39.8 | 780 | 310 | 31 | 190 | 0+7 | 30 |
| 39.8 | 780 | 310 | 31 | 195 | 5 | 25 |
| 39.8 | 780 | 310 | 31 | 190 | 7 | 30 |
| 39.8 | 780 | 310 | 31 | 200 | 7 | 20 |
| 39.8 | 780 | 310 | 31 | 200 | 4 | 20 |
| 39.8 | 1 280 | 509 | 34 | 200 | 5 | 20 (1.3) |
| | 780 | 310 | 31 | 200 | 5 | 20 (2) |
| 50.4 | 695 | 350 | 35 | 285 | 5 | 20 (2) |
| | 715 | 360 | 36 | 265 | 5 | 20 (2) |
| | 734 | 370 | 37 | 245 | 5 | 20 (2) |
| 55.3 | 686 | 380 | 38 | 294 | 5 | 20 (2) |
| 52 | 711 | 370 | 37 | 269 | 5 | 20 (2) |
| 52 | 595 | 310 | 31 | 375 | OXO + 5 EO[1] | 30 (3) |

1) TA + 5EO was replaced by OXO + 5EO
In Table 2, the columns designate the following:
Column 1: "AS-content", the content of active substance of the moist aluminosilicate,
Columns 3 and 4: "AS in suspension", the content of active substance of the formed suspension in grams or % by weight,
Column 2: the amount in grams of moist aluminosilicate used for the preparation of the suspension;
Column 5: the amount of water added to the moist aluminosilicate;
Columns 6 and 7: the added ethoxylation product and its weight, as added, in grams or % by weight.

All suspensions were very stable and could be transferred without any problems by pumping from a storage tank with the aid of a commercial peristaltic pump (model IKA P 20, IKA-Werk, Stauffen/Breisgau, F. R. of Germany), even after periods of one day and more.

EXAMPLE 2

A suspension of 31% by weight (AS) of pure microcrystalline aluminosilicate (γ2) was prepared in water. Dispersing agent 9 of Table 1 (CA + 6EO) was used as dispersing agent according to the invention in an amount of 1.8% by weight, based on the total suspension. The stability of the suspension was further improved by the addition of traces (about 0.01% by weight) of tallow fatty amine (tallow fatty amine is the primary amine corresponding to the above-defined tallow fatty alcohol) and tallow fatty acid. Suspensions prepared in this manner were stable for months.

EXAMPLE 3

Powdery, trickleable washing agents of the compositions A and B given in Table 3 were prepared as follows: A stock suspension, previously prepared by the addition of a moist aluminosilicate (prepared according to γ2 ) to a dispersion of the dispersing agent, heated to 70° C, and which had a content of 36% by weight of aluminosilicate and 2% by weight of TA + 5EO, based on the total weight of the suspension, was pumped from a storage tank into a vessel to which were added, one at a time and with agitation the remaining components and sufficient water to form a detergent slurry containing approx. 45% by weight of water.

This slurry was pumped through spray jets at the upper end of a spray-drying tower and converted into a fine powder by atomizing the slurry into a stream of hot air (about 260° C).

TABLE 3

| A | | B | |
|---|---|---|---|
| ABS | 1.4% | TA + 10EO | 7.0% |
| OA + 10EO | 8.0% | TA + 5EO[2)] | 2.0% |
| Sodium tripolyphosphate | 7.8% | Sodium tripoly-phosphate | 20.0% |
| Sodium silicate | 5.4% | | |
| CMC | 0.8% | Sodium carbonate | 5.0% |
| Aluminosilicate[1)] | | Sodium silicate | 3.0% |
| (AS) | 36.0% | CMC | 1.8% |
| TA + 5EO[1)] | 2.0% | Aluminosilicate[1)] | |

TABLE 3-continued

| A | | B | |
|---|---|---|---|
| Rest water and $Na_2SO_4$ | | (AS) | 18.0% |
| | | TA + 5EO[1)] | 1.0% |
| | | EDTA | 0.5% |
| | | $MgSiO_3$ | 2.5% |
| | | Perborate[3)] | 28.0% |
| | | Soap | 2.5% |
| | | Rest water and $Na_2SO_4$ | |

[1)]added with the stock suspension;
[2)]TA + 5EO added with the other components;
[3)]added after spraying-drying.

Instead of using a suspension stabilized with TA + 5EO, the detergent corresponding to B may be prepared with suspensions containing polyacrylate (AC) which are also very stable but also excellent pumpable. The sodium tripolyphosphate portion can be reduced correspondingly, since polyacrylate is a complexing agent for calcium. When preparing detergents containing ABS. here also a suspension containing ABS according to the invention can be used. An ABS with 11 to 13 carbon atoms in the alkyl rest is used in the specific case. The stabilization is hereby somewhat less.

EXAMPLE 4

Pumping and Storage Tests with Aluminosilicate Suspensions of the Invention

Sodium aluminosilicates in the amount of 594 to 780 gm and having various moisture contents, were added to the emulsions heated to 65° to 70° C, of 190 to 360 gm of water and 10 to 30 gm of dispersing agent, and homogenized. The amount was calculated in such a manner that the AS content of the aluminosilicate in the suspensions was about 31% to 34%. The homogeneous suspensions were circulated by a peristaltic pump (model IKA P 20) for one hour at room temperature and with continued agitation. Then, the circulating and agitation were stopped for one hour. Subsequently, agitation and circulating were continued. At this point, the suspension of the comparison test, prepared withoutrdispersing agents, could no longer be agitated and circulated.

After further agitating and circulating for 4 to 6 hours, the suspensions of the invention were allowed to stand overnight and the settling characteristics at room temperature were determined visually, the next day and after several days of standing.

In the following Table 4, the column headings have the following meanings: sediment = 100% means that the suspension was completely (100%) homogeneous and stable (last column).

The suspensions were again tested for their pumping characteristics after the determination of the settling characteristics. All recorded substances were found to be suitable dispersing agents, since the suspensions prepared with them could be agitated and circulated or pumped out without problems, after standing.

The individual batches can be found in Table 4 in tabular form. An aluminosilicate prepared according to $\beta 2$ and of the approximate composition $Na_2O \cdot Al_2O_3 \cdot 2\ SiO_2$ was used. Unless stated other wise, it was added while still moist from the preparation. The particle size was mainly between 5 and 15 $\mu$.

content) of 31% and a content of 2% dispersing agent. The phosphonic acids are added as 1. tetrasodium salts,
2. disodium salts, and
3. free acids.

The suspensions were very stable and can be worked up into detergents by the addition of tensides and, if desired other detergent components, by subsequent spray-drying.

EXAMPLE 7

Suspensions of 31% sodium aluminosilicate and 4% phosphoric acid butyl ester or phosphoric acid isoctyl ester (adjusted to pH 10) are prepared according to Example 6. The phosphoric acid esters are products with about 1.5 mol alcohol per mol phosphoric acid. The suspensions were very stable.

TABLE 4

Preparation of aluminosilicate suspensions; pumping and standing tests

| AS content of silicate | Amount used gm | AS in suspension gm % | Added water gm | Dispersing Agent | gm % | Pumping characteristics after 1 hr. | 24 hrs. | Sediment % (days) |
|---|---|---|---|---|---|---|---|---|
| 39.8 % AS | 780 | 310 31 | 220 | — | — | — | omitted | 50[1] |
| | 780 | 310 31 | 200 | AC[3] | 20 (2) | + | + | 98 (1) |
| | 780 | 310 31 | 190 | AC[3] | 30 (3) | + | + | 97 (1) |
| 50.8% AS[2] | 610 | 310 31 | 370 | AC[3] | 20 (2) | + | + | n.b. |
| 50.8 % As[2] | 610 | 310 31 | 360 | Cop 1 | 30 (3) | + | + | 95 (1) |
| | 610 | 310 31 | 360 | Cop 2 | 30 (3) | + | + | 95 (1) |
| 48.4 % AS[2] | 640 | 310 31 | 330 | Cop 3 | 30 (3) | + | + | 100 (1) |
| | 640 | 310 31 | 340 | Cop 4 | 20 (2) | + | + | 95 (1) |
| | 640 | 310 31 | 330 | Cop 5 | 30 (3) | + | + | 100 (1) |
| | 640 | 310 31 | 330 | Cop 6 | 30 (3) | + | + | 85 (1) |
| 52.1 % AS[2] | 594 | 310 31 | 364/22[5] | PVA 30 | 20 (2) | + | + | 75 (6) |
| | 594 | 310 31 | 364/40[5] | PVA 50 | 20 (2) | + | + | 80 (6) |
| | 594 | 310 31 | 299/87[5] | PVA 70 | 20 (2) | + | + | 85 (4) |
| | 594 | 310 31 | 364/40[5] | PVA 90 | 20 (2) | + | + | 80 (7) |
| F147 (50% AS) | 615 | 310 31 | 345/20 | PVA 90 | 20 (2) | + | + | 94 (1) |
| | 674 | 340 | 316/— | PVA 90 | 10 (1) | + | + | 88 (1) |

Explanations for Table 4

[1]The aqueous aluminosilicate suspension formed 50% solid sediment on standing.

[2]The moist aluminosilicate was prepared in the Lodige mixer, starting with spray-dried material with a content of 79% AS and additional water.

[3]The polyacrylic acid solution was adjusted to pH 10 with NaOH before the addition of the sodium aluminosilicate. Poly-(α-hydroxyacrylic acid) was used as an alternate.

[4]Pumping characteristics after x hours;

— = can no longer be circulated by pumping

\+ = can be circulated and removed by pumping.

[5]The polyvinyl alcohols used are difficult to dissolve in water; therefore varying amounts of dimethyl sulfoxide (20 to 87 gm) were added as dissolving intermediaries the corresponding amounts of water were withheld from the suspensions. No dimethyl sulfoxide had to be added when 1% PVA 90 was used. The polyvinyl alcohols employed were commercial products (Mowiol® by Farbwerke Hoechst). The most suitable was Mowiol 76/98®.

EXAMPLE 5

The suspensions according to the invention were prepared by the addition of aluminosilicates I, II, XIII, IX or XXm to a dispersion of TA + 5EO in water, which was warmed to 60° to 70° C with the formation of silicate suspensions with a content of 33% AS and 2% TA + 5EO.

The suspensions were cooled to room temperature and observed at that temperature. Thus, the evaluation was carried out at room temperature, as in Example 1. The suspensions are very stable.

EXAMPLE 6

A moist aluminosilicate with the approximate composition $Na_2O \cdot Al_2O_3 \cdot 2\ SiO_2$, and a moisture content of 50%, prepared according to $\beta 2$ and washed until pH 10 is reached, is added to an aqueous solution of a. 1,3-hydroxyethane-1,1-diphosphonic acid b. dimethylaminomethane-diphosphonic acid, with the formation of suspensions with a solids content (AS

EXAMPLE 8

A suspension of 31% sodium aluminosilicate (AS content) and 4% akylbenzene sulfonate (ABS) was prepared according to Example 6. The ABS was used as the salt in one case, as the free acid in the other. Stable suspensions were obtained.

Also, a sulfonate obtained by sulfonation with $SO_3$ of the methyl ester of a hardened tallow fatty acid, or an olefin sulfonate obtained by sulfonation of straight-chain, non-terminal olefins with 12 to 18 carbon atoms and hydrolysis of the sulfonation product could be employed in the same amount to give stable suspensions. The strong foaming of the suspensions was controlled without any difficulty by the addition of small amounts (0.02%) of a commercial silicone antifoaming agent. The suspensions are especially suitable for the preparation of slurries for the preparation of detergents containing aluminosilicate. However, they may also be spray-dried directly and converted into powdery water softeners or builders for washing agent compositions.

EXAMPLE 9

Aluminosilicate suspensions were prepared according to Example 4, with a 31% AS content and a content of the following dispersing agents (% AS; % dispersing agent):

a. stearic acid monoglyceride (31/2)

b. stearic acid propylene glycol ester (31/2)

c. reaction product of the reaction of tallow fatty acid and N-hydroxyethyl ethylene diamine (31/2)

d. tallow fatty amine (long-chain amine derived from tallow fatty acid by reduction) (31/2)

e. adduct of 5 mols of ethylene oxide per mol of tallow fatty amine (31/2)

f. oleyl alcohol adducted with 5 mols of ethylene oxide per mol of the alcohol (31/2)

g. mixture of saturated $C_{12}$ (70 to 75%)— and $C_{14}$ (25 to 30%)— alcohols ethoxylated with 3 to 4 mols of ethylene oxide (31/3)

h. corn starch (31/1) or carboxymethyl cellulose (31/1)

i. poly(α-hydroxyacrylic acid) (31/2)

k. polylactone of poly(α-hydroxyacrylic acid) (31/2).

The suspensions are very stable. The stabilized suspensions are suitable for the preparation of aqueous slurries of washing agent composition components that are then spray-dried. The stabilized suspensions can also be converted directly into granulates by the addition of compounds which bind water in the form of water of crystallization (for example, pentasodium tripolyphosphate).

EXAMPLE 10

An aqueous suspension, prepared according to Example 1 and containing about 30% aluminosilicate (AS) and 2% TA + 5EO, was sprayed into a stream of hot air and thereby dried, i.e., the adhering water was removed. The spray-dried product contained considerably less dust than a corresponding product prepared without the TA + 5EO. The powdery aluminosilicate obtained is especially suitable as a water softener and as a builder in washing agent compositions.

All of the suspensions described in the above examples were clearly improved with respect to their stability and flow properties. In the connection, however, the nonionic tensides of the group 4 proved to be surprisingly and clearly superior.

The preceeding specific embodiments are illustrative of the practice of the invention. It is to be understood however, that other expedients known to those skilled in the art or disclosed herein, may be employed without departing from the spirit of the invention or the scope of the appended claims.

We claim:

1. An aqueous suspension having a pH of between 7 and 12 of water-insoluble, calcium-binding aluminosilicates with an improved stability against settling consisting essentially of (A) from 20% to 50% by weight on the anhydrous basis of at least one crystalline, finely-divided, water-insoluble silicate compound having a calcium-binding power of at least 50 mg CaO/gm of anhydrous active substance and a primary particle size of from 0.1μ to 100μ and having the formula, combined water not shown $$(M_2O)_x \cdot Me_2O_3 (SiO_2)_y$$

where M is a member selected from the group consisting of sodium and potassium, $x$ is a number of from 0.7 to 1.5, Me is aluminum or boron, and $y$ is a number from 0.8 to 6, and (B) from 0.5% to 6% by weight of at least one organic dispersing agent selected from the group consisting of the free acids and alkali-metal salts of 1. an organic phosphonic acid having at least one further acid group selected from the group consisting of phosphonic acid and carboxyl, and
2. an alkyl acid phosphate emulsifier having from 4 to 10 carbon atoms in the alkyl, in water, said aqueous suspension being capable of being pumped after 24 hours of standing.

2. The aqueous suspension of claim 1 wherein said crystalline silicate compound has the following interference lines in the x-ray diffraction diagrams as d-values in A obtained with Ca-$K_\alpha$ radiation: 4.1; 3.68; 3.38; 3.26; 2.96; 2.73; 2.60.

3. The aqueous suspension of claim 1 wherein said crystalline silicate compound as the following interference lines in the x-ray diffraction diagrams as d-values in A obtained with Ca-$K_\alpha$ radiation: 4.4; 3.8; 2.88; 2.79; 2.66.

4. The aqueous suspension of claim 1 wherein said silicate compound has a calcium-binding power of from 100 mg to 200 mg CaO/gm of anhydrous active substance.

5. The aqueous suspension of claim 1 wherein said silicate compound is present in an amount of from 20% to 42% by weight on the anhydrous basis.

6. The aqueous suspension of claim 1 wherein said silicate compound is present in an amount of from 30% to 38% by weight on the anhydrous basis.

7. The aqueous suspension of claim 1 wherein said component B is an organic phosphonic acid having at least one further acid group selected from the group consisting of lower alkane polyphosphonic acids, amino-lower alkane polyphosphonic acids, hydroxy-lower alkane polyphosphonic acids, phosphono-lower alkane carboxylic acids, amino substituted phosphono-lower alkane carboxylic acids and hydroxy substituted phosphono-lower alkane carboxylic acids.

8. The aqueous suspension of claim 1 wherein said component B is an alkyl acid phosphate emulsifier having from 4 to 10 carbon atoms in the alkyl.

9. An aqueous suspension having a pH of between 7 and 12 of water-insoluble, calcium binding aluminosilicates with improved stability against settling consisting essentially of (A) from 20% to 42% by weight on the anhydrous basis of at least one crystalline, finely-divided, water-insoluble silicate compound having a calcium binding power of from 100 to 200 mg CaO/gm when measured as described on pages 30 to 31 of the specification and a primary particle size of from 0.1μ to 30μ and having the formula, combined water not shown $$(M_2O)_x \cdot Al_2O_3 \cdot (SiO_2)_y$$

where M is a member selected from the group consisting of sodium and potassium, $x$ is a number from 0.7 to 1.5 and $y$ is a number from 0.8 to 6, and (B) from 0.5% to 6% of an organic phosphonic acid having at least one further acid group selected from the group consisting of lower alkane polyphosphonic acids, amino-lower alkane polyphosphonic acids, hydroxy-lower alkane polyphosphonic acids, phosphono-lower alkane carboxylic acids, amino substituted phosphono-lower alkane carboxylic acids and hydroxy substituted phosphono-lower alkane carboxylic acids, in water, said aqueous suspension being capable of being pumped after 24 hours standing.

10. An aqueous suspensiion having a pH of between 7 and 12 of water-insoluble, calcium binding aluminosilicates with improved stability against settling consisting essentially of (A) from 20% to 42% by weight on the anhydrous basis of at least one crystalline, finely-divided, water-insoluble silicate compound having a calcium binding power of from 100 to 200 mg CaO/gm when measured as described on pages 30 to 31 of the specification and a primary particle size of from 0.1μ to 30μ and having the formula, combined water not shown $$(M_2O)_x \cdot Al_2O_3 \cdot (SiO_2)_y$$

where M is a member selected from the group consisting of sodium and potassium, $x$ is a number of from 0.7 to 1.5 and $y$ is a number from 0.8 to 6, and (B) from 0.5% to 6% of an alkyl acid phosphate emulsifier having from 4 to 10 carbon atoms in the alkyl, in water, said aqueous suspension being capable of being pumped after 24 hours standing.

* * * * *

UNITED STATES PATENT OFFICE

CERTIFICATE OF CORRECTION

Patent No. 4,072,622 Dated Feb. 7, 1978

Inventor(s) DIETER KÜHLING, JOSEF HUPPERTZ, PETER KRINGS and HERBERT REUTER

It is certified that error appears in the above-identified patent and that said Letters Patent are hereby corrected as shown below:

| Col. | Line | |
|---|---|---|
| [75] | 4 | "Hilden" should be --Hilden Rhld.-- |
| [56] | 4 | "Dywer" should be --Dwyer-- |
| 7 | 31 | "phenylmethanel" should be --phenylmethane-1-- |
| 10 | 18 | "α-sul-fo-fatty" should be --α-sulfo-fatty-- |
| 12 | 27 | "ahs" should be --has-- |
| 18 | 43 | "$Na_2O$ 3.46" should be --$Na_2O$ . 3.46-- |
| 18 | 49 | "$Na_{210}$" should be --$Na_2O$-- |
| 19 | 12 | "4-07%" should be --4-7%-- |
| 19 | 36 | "alchol" should be --alcohol-- |
| 19 | 44 | "$NA_2O$" should be --$Na_2O$-- |
| 19 | 54 | ">0 1,500" should be -->1,500-- |
| 20 | 36 | "53917°C" should be --53917,°C-- |
| 24 | 8 | "desired other" should be --desired, other-- |

Signed and Sealed this

*Twenty-eighth* Day of *November 1978*

[SEAL]

*Attest:*

RUTH C. MASON
*Attesting Officer*

DONALD W. BANNER
*Commissioner of Patents and Trademarks*